US008791999B2

(12) United States Patent
Marcu

(10) Patent No.: US 8,791,999 B2
(45) Date of Patent: Jul. 29, 2014

(54) SYSTEMS AND METHODS FOR DISPLAY CALIBRATION

(75) Inventor: Gabriel G. Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 13/011,852

(22) Filed: Jan. 21, 2011

(65) Prior Publication Data
US 2012/0188367 A1 Jul. 26, 2012

(51) Int. Cl.
*H04N 7/18* (2006.01)
*G01B 11/02* (2006.01)

(52) U.S. Cl.
CPC ........... *G01B 11/022* (2013.01); *H04N 7/18* (2013.01)
USPC ........................................................ 348/135

(58) Field of Classification Search
USPC .................................. 348/135; 382/162–167
See application file for complete search history.

(56) References Cited

U.S. PATENT DOCUMENTS

| | | | | |
|---|---|---|---|---|
| 5,594,563 A * | 1/1997 | Larson | | 349/74 |
| 6,388,648 B1 * | 5/2002 | Clifton et al. | | 345/88 |
| 6,644,812 B2 * | 11/2003 | Kodama et al. | | 353/31 |
| 6,654,493 B1 * | 11/2003 | Hilliard et al. | | 382/167 |
| 6,926,411 B2 * | 8/2005 | Ouchi et al. | | 353/20 |
| 7,154,649 B2 * | 12/2006 | Pfefferseder et al. | | 359/225.1 |
| 7,728,845 B2 | 6/2010 | Holub | | |
| 2004/0246274 A1 * | 12/2004 | Rykowski et al. | | 345/690 |
| 2006/0007206 A1 | 1/2006 | Reddy et al. | | |
| 2006/0181552 A1 | 8/2006 | Hopple | | |
| 2007/0035556 A1 * | 2/2007 | Hasegawa | | 345/591 |
| 2007/0242064 A1 | 10/2007 | Kuo | | |
| 2009/0122132 A1 * | 5/2009 | Thielman | | 348/14.08 |
| 2009/0174759 A1 * | 7/2009 | Yeh et al. | | 348/14.01 |
| 2010/0188418 A1 * | 7/2010 | Sakai et al. | | 345/594 |

* cited by examiner

*Primary Examiner* — Andy Rao
*Assistant Examiner* — Jared Walker
(74) *Attorney, Agent, or Firm* — Kendall P. Woodruff

(57) ABSTRACT

Methods and data processing systems are disclosed for automatically calibrating display devices. In one embodiment, a data processing system includes a display device having a built-in image capturing device and a mirror system with at least one mirror that is operatively coupled to the image capturing device. The mirror system reflects one or more reference images in a first region of the display device and one or more references images in a second region of the display device to the image capturing device. The references images captured by the image capturing device allow a calibration of colors output from the display device. A reference image in the first region may be compared to different references images in the second region until a match is obtained. In another embodiment, an adjustable mirror system includes at least one adjustable mirror to allow adjustment of the mirror angle for the display calibration.

18 Claims, 10 Drawing Sheets

SYSTEMS AND METHODS FOR DISPLAY CALIBRATION

FIELD OF THE DISCLOSURE

Embodiments of the present disclosure generally relate to calibrating a display of an electronic device.

BACKGROUND OF THE DISCLOSURE

Electronic devices, such as computer systems or wireless cellular telephones or other data processing systems, may often include a display or display device, such as a liquid crystal display (LCD) or light emitting diode (LED) display, for providing a user interface with various images, programs, menus, documents, and other types of information. The display may illuminate or display various colors with a color space such as the CIE XYZ color space created by the International Commission on Illumination in 1931. A specific method for associating three numbers (or tristimulus values) with each color is called a color space.

The display of an electronic device may need to be calibrated in order to better match colors between the display and other types of media including other displays, printers, paper sources, etc. Prior systems for calibrating a display of a device include a color sensor or an external camera system. For example, a color sensor takes a limited number of wideband spectral energy readings along the visible spectrum by using filtered photodetectors for the calibrations. Another prior approach relies on a user to manually perform 5 operations of visual color matching between different color patches. These manual operations are difficult for a typical user to perform accurately. An error with one of the initial manual operations propagates and negatively affects all subsequent manual operations. Another prior approach automatically locates an embedded color calibration chart in an image as described in U.S. patent publication 2008/0304741. The embedded color calibration chart is verified and used to create a color profile of the image. A color calibration chart is an array of several blocks of known color values that is used to calibrate and evaluate the color in systems capable of color reproduction.

SUMMARY OF THE DISCLOSURE

At least certain embodiments of the disclosures relate to methods and data processing systems for automatically calibrating display devices. In one embodiment, a data processing system includes a display device having a built-in image capturing device and a mirror system with at least one mirror that is operatively coupled to the image capturing device. The mirror system reflects one or more reference images in a first region of the display device and one or more references images in a second region of the display device to the image capturing device. One or more processing units are configured to execute instructions to display the reference images to be captured by the image capturing device through the mirror system and configured to allow a calibration, of colors output from the display device, using the references images captured by the image capturing device. A reference image in the first region may be compared to different references images in the second region until a match is obtained. Then, the display calibration is derived based on the match.

In one embodiment, an adjustable mirror system includes an enclosure operatively coupled to a device having an integrated camera and a display. The adjustable mirror system includes at least one mirror being supported by the enclosure. The at least one mirror is operatively coupled to the integrated camera to reflect one or more reference images from the display to the camera to allow a calibration, of colors output from the display, using the one or more reference images. At least one mirror has an adjustable angle to allow a user to adjust the mirror angle for the calibration even if the viewing angle between a user and the display is different than 90 degrees.

In another embodiment, a system for calibrating a projection system includes a data processing system that is coupled to the projection system. The data processing system includes one or more processing units and a display device having an integrated camera. A projector screen is operatively coupled to both the projection system and the camera. The one or more processing units are configured to execute instructions to display at least one reference image via the projection system on the projector screen and configured to allow a calibration, of colors output from the projection system, using at least one image captured by the camera.

Other systems and methods are also described, and machine readable media, which contain executable instructions to cause a machine to operate as described herein, are also described.

BRIEF DESCRIPTION OF THE DRAWINGS

The present disclosure is illustrated by way of example and not limitation in the figures of the accompanying drawings in which like references indicate similar elements.

DETAILED DESCRIPTION

Methods and data processing systems are disclosed for automatically calibrating display devices. In one embodiment, a data processing system includes a display device having a built-in image capturing device and a mirror system with at least one mirror that is operatively coupled to the image capturing device. The mirror system reflects one or more reference images in a first region of the display device and one or more references images in a second region of the display device to the image capturing device. One or more processing units are configured to execute instructions to display the reference images to be captured by the image capturing device through the mirror system and configured to allow a calibration, of colors output from the display device, using the references images captured by the image capturing device. A reference image in the first region may be compared to different references images in the second region until a match is obtained. Then, the display calibration is derived based on the match.

Figure 1:
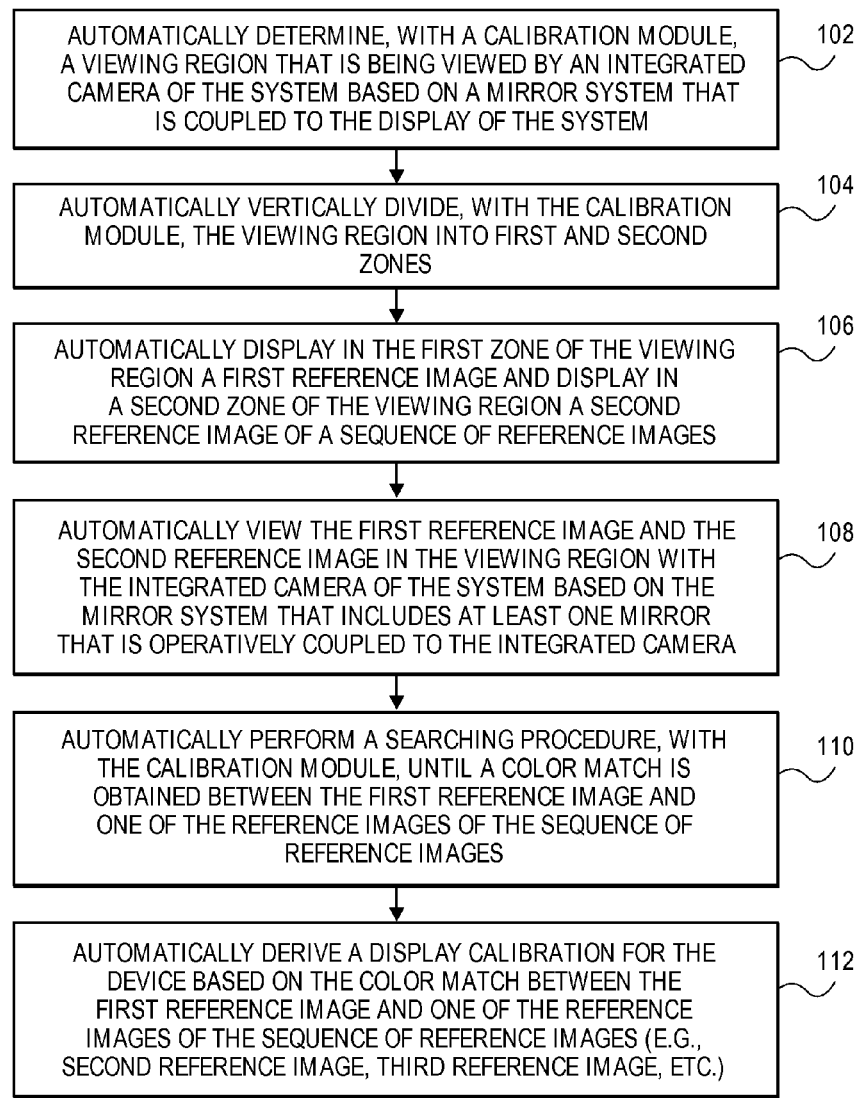
FIG. 1 illustrates a flow diagram in one embodiment of the present invention for a computer-implemented method 100 of calibrating a display in a data processing system.

FIG. 1 illustrates a flow diagram in one embodiment of the present invention for a computer-implemented method 100 of calibrating a display in a data processing system. The computer-implemented method 100 is performed by processing logic that may comprise hardware (circuitry, dedicated logic, etc.), software (such as is run on a general purpose computer system or a dedicated machine or a system), or a combination of both.

At block 102, processing logic (e.g., one or more processing units) automatically determines, with a calibration module, a viewing region that is being viewed by an integrated camera of the device based on a mirror system that is coupled to the display. At block 104, the processing logic (e.g., one or more processing units) automatically vertically divides, with the calibration module, the viewing region into first and second zones.

At block 106, processing logic may automatically display in the first zone of the viewing region a first reference image and may display in a second zone of the viewing region a second reference image of a sequence of reference images. At block 108, the processing logic automatically views the first reference image and the second reference image in the viewing region with the integrated camera of the system based on the mirror system that includes at least one mirror that is operatively coupled to the integrated camera. The processing logic can automatically distinguish between the first and second zones of the viewing region. In one embodiment, the reference images are a set of patterns or a set of colors. If reference images are patterns of colors, then the difference in patterns can be recognized to automatically distinguish between the first and second zones. Alternatively, one pattern may be held constant while the other pattern changes and this can be used to automatically distinguish between the first and second zones or additional zones. In an alternative embodiment, if the integrated camera has been previously calibrated for colors, then only one reference image is displayed in a region and reflected by the mirror system for calibrating the display device.

At block 110, the processing logic automatically performs a searching procedure, with the calibration module, until a color match is obtained between the first reference image and one of the reference images of the sequence of reference images. The searching procedure can be automatically performed without user intervention (e.g., visual matching) and without using a color sensor, colorimeter, external camera, etc.

The searching procedure may be performed with a special heuristic to ensure quick convergence of a color match. For example, a binary search may be implemented for each color channel in RGB values. Next, at block 112, the processing logic automatically derives a display calibration for the device based on the color match between the first reference image and one of the reference images of the sequence of reference images (e.g., second reference image, third reference image, etc).

In one embodiment, the first zone displays a pattern independent of the gray tracking and gamma correction for the display and the second zone display a solid color (e.g., gray). The color of the second zone is adjusted according to the searching procedure of block 110 until a color match of the two zones is automatically obtained by the processing logic. After a sequence of patterns are matched, the processing logic uses the calibration module to derive optimized display calibration information that includes look up tables (e.g., three 1 dimensional look up tables). These look up tables store gamma correction and gray tracking correction for the display based on a certain target gamma and a target white point that are initially set by the user. The gamma and gray tracking calibration information obtained with the mirror system plus chromaticity information are used to create the ICC display profile that is used for color matching operations in the system. The chromaticity information may be captured from default system characteristics (e.g., extended display identification data (EDID)). The EDID may include manufacturer information (e.g., name and serial number), product type, phosphor or filter type, timing supported by the display, display size, luminance data, pixel mapping data, white point, gamma, chromaticity, etc.

A device profile characterizes the relation between the color data (e.g., color components detected, color components to be printed or displayed) for the device and the color on the device (e.g., color to be scanned, color print-out, or color displayed). Color data for the device is generated from or used to generate the color on the color device. A typical device profile includes data for converting between color on device, which is typically represented in a device independent color space (e.g., $L*a*b*$) as a result of instrumental measurements, and color data, which is typically represented in a device dependent color space (e.g., RGB) as a signal generating, or being generated from, the color on device. Thus, the device profile is essentially a digital representation of the color conversion capability of the color device. The device profile can be in terms of a gamma, a look up table or matrix for chromaticity data, and/or other parameters.

When a color data is converted to the color on the device according to a device profile and converted back to another color data according to another device profile, the result is a color correction to account for the differences between the devices. Thus, a number of device profiles can be created for a color device operating under a number of different conditions so that color correction can be performed using the device profiles.

Figure 2:
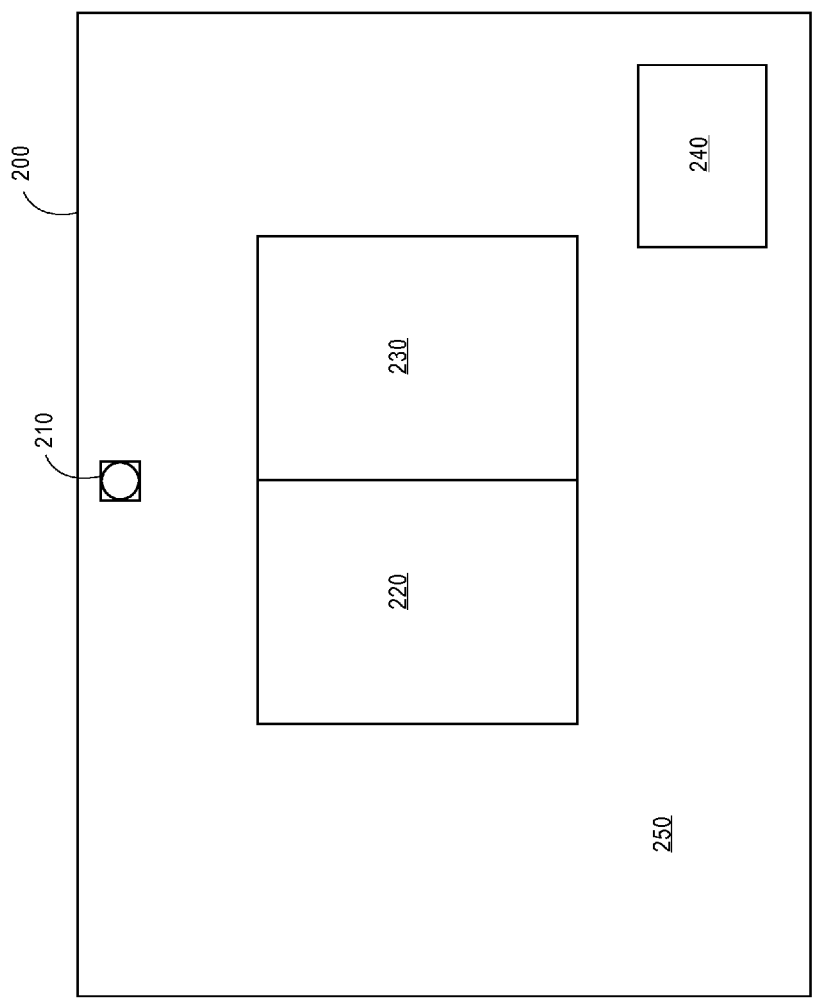
FIG. 2 shows a display device with an integrated image capturing device for comparing references images and calibrating the display device in one embodiment of the present invention.

FIG. 2 shows a display device with an integrated image capturing device for calibrating the display device in one embodiment of the present invention. The display device 200 includes the integrated image capturing device 210, a zone 220, a zone 230, and a remaining zone 250. A first sequence of reference images can be displayed in zone 220 and compared to a sequence of reference images in zone 230. A calibration module performs a search procedure to determine a color match between images in the different zones. The image capturing device 210 can view the zones 220 and 230 based on a mirror system (not shown) being coupled to the display device 200. The mirror system optically couples the image capturing device 210 to the zones 220 and 230. In one embodiment, the user interface 240 displays the images being viewed by the image capturing device 210.

Figure 3:
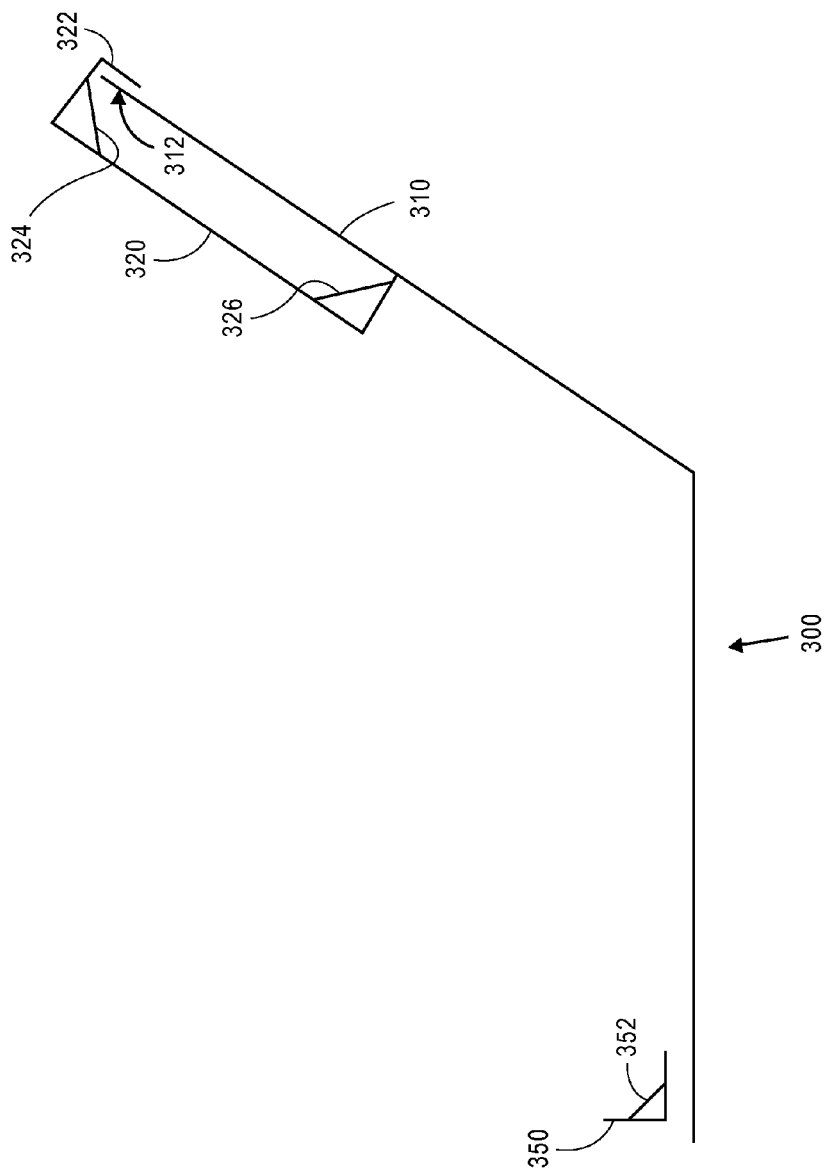
FIG. 3 illustrates a side view of a data processing system having a mirror system coupled to a display device of the data processing system in one embodiment of the present invention.
Figure 9:
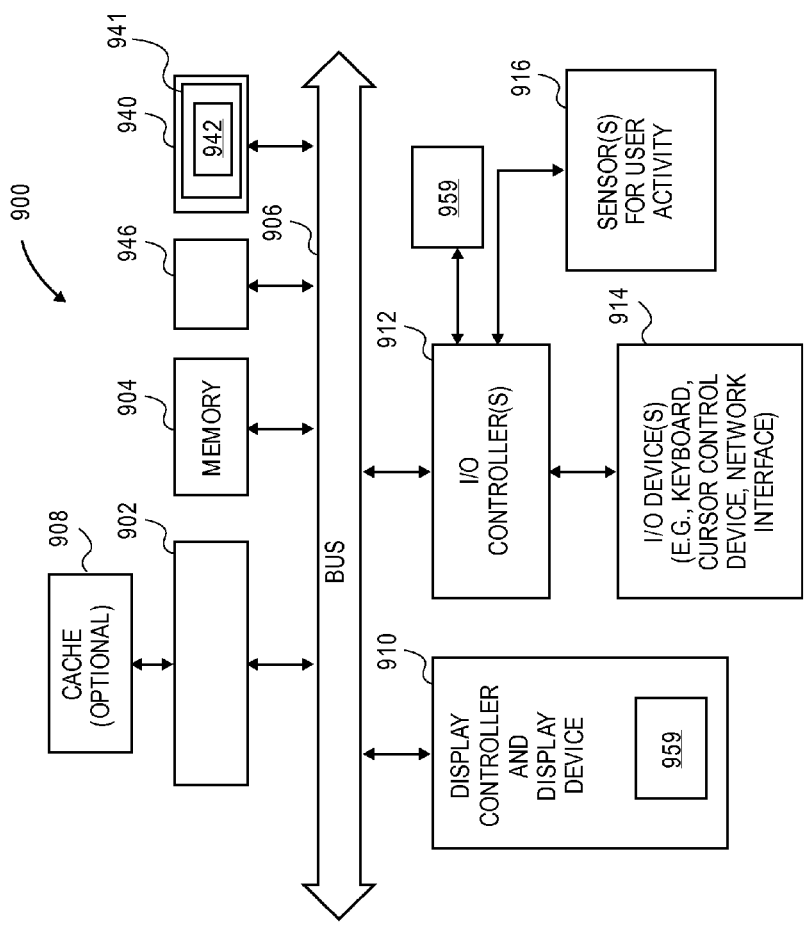
FIG. 9 is a block diagram of one embodiment of the present invention of a data processing system that generally includes a display device, lens, and image sensor.
Figure 10:
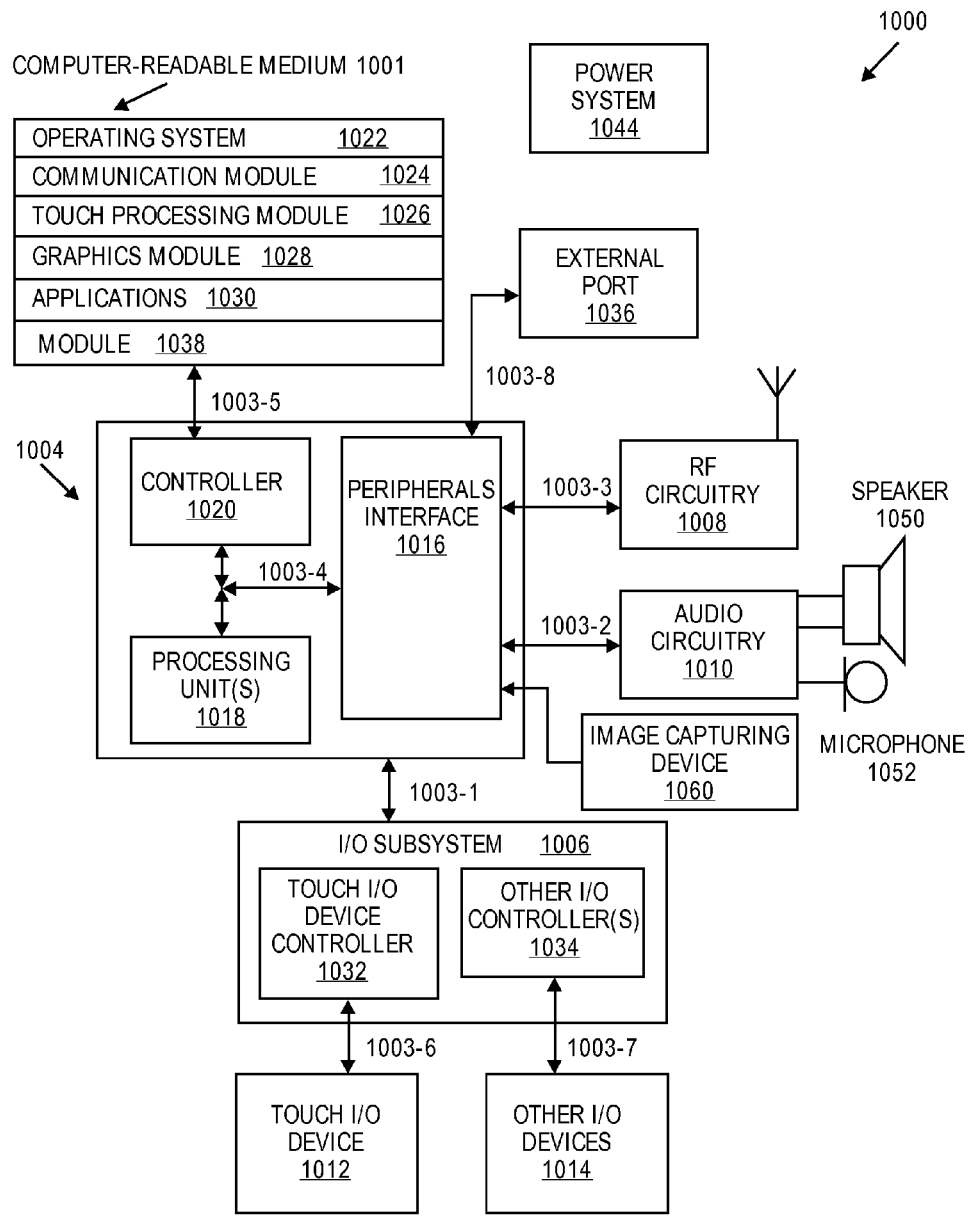
FIG. 10 is a block diagram of one embodiment of the present invention of a system that generally includes one.

FIG. 3 illustrates a side view of a data processing system having a mirror system coupled to a display device of the data processing system in one embodiment of the present invention. The data processing system 300 includes the display device 310 having a built-in image capturing device 312. A mirror system 320 with at least one mirror (e.g., 324, 326) is operatively coupled to the image capturing device 312. The mirror system 320 may attach to the display device 310 with an attachment 322 (e.g., hanger). The mirror system 320 reflects one or more reference images in a first region (e.g., 220) of the display device and also one or more references images in a second region (e.g., 230) of the display device 310 to the image capturing device (e.g., 312, 959, 1060). One or more processing units (e.g., 902, 1018) are coupled to the display device (e.g., 310, 910, 1012, 1014) as illustrated in FIGS. 3, 9, and 10. The one or more processing units are configured to execute instructions to display the reference images to be captured by the image capturing device through the mirror system 320 having at least one mirror. The one or more processing units are configured to allow a calibration, of colors output from the display device, using the references images captured by the image capturing device.

In one embodiment, the calibration is performed automatically without the intervention of a user and without an external image capturing device. The calibration may include comparing a first reference image displayed on the first region of the display device to a second reference image or sequence of images displayed on the second region of the display device. The calibration may include controlling the output of the remaining region 250 of the display device outside of the regions 220 and 230 to control output values of the image capturing device to be within a mid-range of output values rather than near an extreme (e.g., maximum, minimum) of the value. For example, if the image capturing device has output values between 0 and 255, then the mid-range will not have output values close to 0 or 255.

In an alternative embodiment, the mirror system 320 is replaced with a mirror system 350 having a single mirror 352 with the mirror system being located on or near a keyboard or lower section of the data processing system 300. The single mirror 352 reflects the reference images from the certain regions (e.g., first region, second region) of display device 310 to the image capturing device 312. This single mirror 352 may adjust to optimize the calibration.

Figure 4:
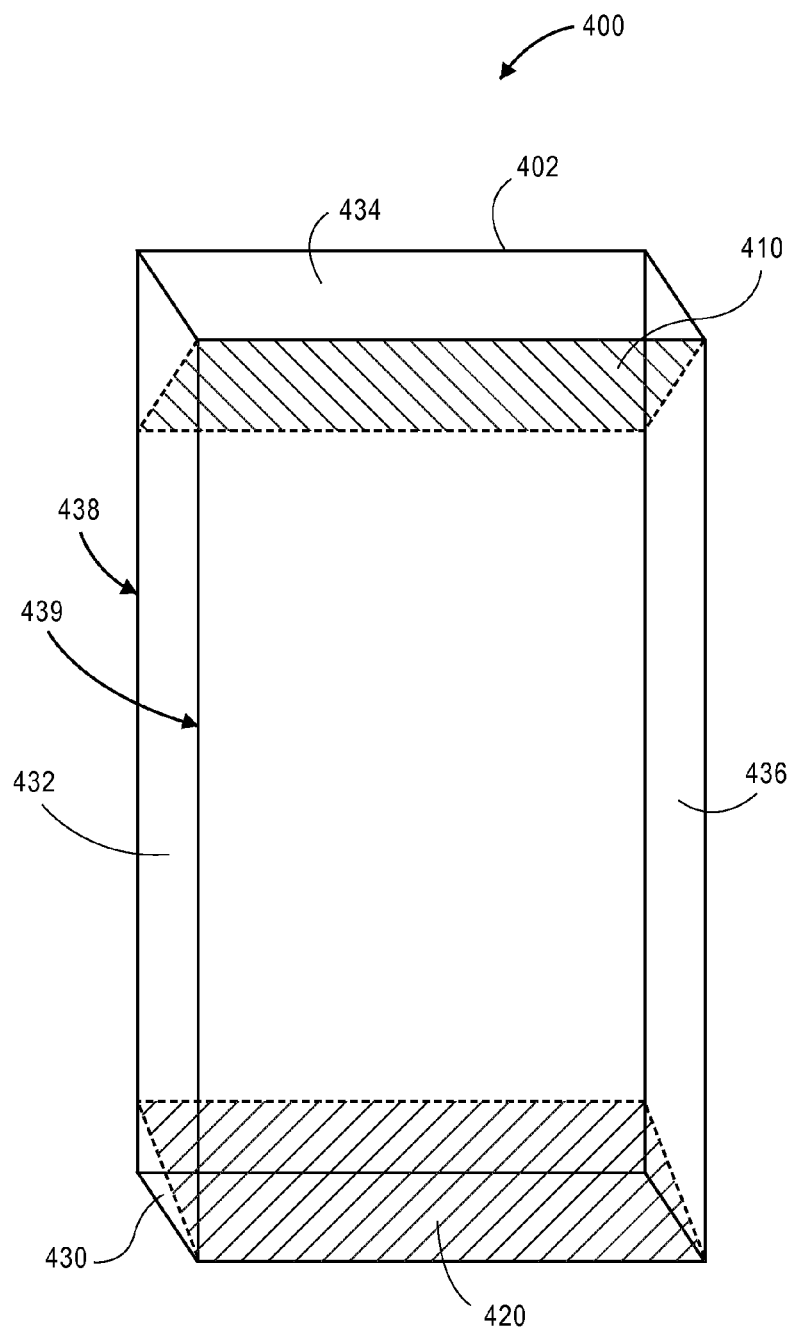
FIG. 4 illustrates a mirror system in one embodiment of the present invention.

FIG. 4 illustrates a mirror system in one embodiment of the present invention. The mirror system 400 includes mirrors 410 and 420 and an enclosure 402. The enclosure 402 includes peripheral sections 430, 432, 434, 436, rear section 438, and front section 439. The front section 439 may be partially or completely open in order for the mirrors 410 and 420 to optically couple an image capturing device to regions of the display device. The enclosure 402 is designed to block external ambient light from the image capturing device (e.g., camera) other than light reflected by the at least one mirror from regions of the display device that have one or more reference images.

In one embodiment, the enclosure 402 is operatively coupled to a system having an integrated camera and a display. The mirrors 410 and 420 are supported by the enclosure. The mirrors are operatively coupled to the integrated camera (e.g., 210) to reflect one or more reference images from the display (e.g., 200) to the camera to allow a calibration, of colors output from the display, using the one or more reference images. At least one mirror (e.g., 410, 420, 720, 730) may have an adjustable angle (e.g., 722, 732) to allow a user to adjust the mirror angle for the calibration even if the viewing angle (e.g., 752) between a user (e.g., 750) and the display (e.g., 702) is different than 90 degrees as illustrated in FIG. 7 in accordance with one embodiment of the present invention.

Figure 7:
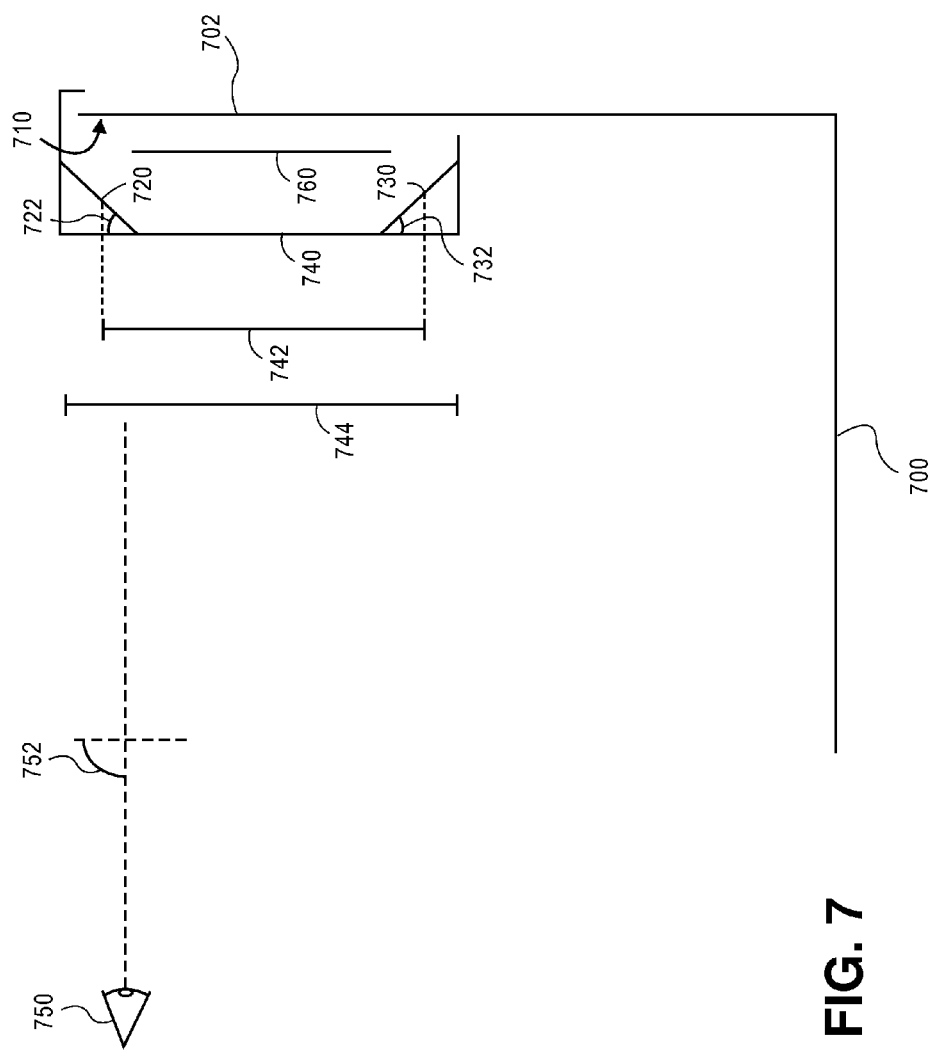
FIG. 7 illustrates a side view of a data processing system having a mirror system coupled to a display device of the data processing system for a particular viewing angle of a user in one embodiment of the present invention.

FIG. 7 illustrates a side view of a data processing system having a mirror system coupled to a display device of the data processing system for a particular viewing angle of a user in one embodiment of the present invention. The adjustable angle of the at least one mirror is an angle between the mirror and the display that can be different than 45 degrees if the viewing angle is different than 90. The adjustable mirror system (e.g., 740) may include two mirrors 720 and 730 with adjustable angles 722 and 732, respectively. FIG. 7 illustrates a viewing angle of 90 degrees and adjustable mirror angles of 45 degrees such that the image capturing device views the display at 90 degrees to match the viewing angle of the user with respect to the display. If the viewing angle changes, then one or both of the adjustable mirror angles may change as well. For example, if the viewing angle increases beyond 90 degrees based on the display 702 being tilted away from the user, then the mirror angle 732 may decrease to less than 45 degrees to compensate for the change in viewing angle.

The angles of the mirrors may also be adjusted to obtain the maximum efficiency of the image capturing device for low gray level and compensation of high noise levels. For example, the angle of the second mirror can be made variable to view the display device at various viewing angles for optimizing the signal to noise ratio. In this case, an internal LUT is used to convert the camera data from a camera at an angle that is different than 90 degrees to camera data for a camera viewing the display device at an angle of 90 degrees.

The automated calibration makes no assumptions about the built-in image capturing device (e.g., camera). The image capturing device needs no calibration, no fixed gain, no special lenses, and no special camera with a certain signal to noise ratio because the searching procedure discussed above compares images taken simultaneously or nearly simultaneously by the image capturing device, rather than relying on absolute readings of the image capturing device. The searching procedure dynamically minimizes a differential signal based on a comparison of a reference image in one region and a sequence of reference images in a second region of the display device. The automatic calibration is faster, better, and more reliable than manual calibration results of a typical user.

In one embodiment, the adjustable mirror system (e.g., 400, 740) includes two mirrors having an adjustable distance (e.g., distance 742) between the mirrors and corresponding change in length 744 of the enclosure 702 in order to avoid a moiré effect seen by the image capturing device (e.g., 710). The moiré effect may be caused by a certain ratio of the sensor's pixels of the image capturing device and the display's pixels that result in a blurred or bleeding image. A longer distance 742 between the mirrors may help to reduce the moiré effect. Additionally, a width and shape of the enclosure can be altered to reduce the moiré effect. In one embodiment, when one end of the enclosure or mirror system is attached near an upper portion of a display device and near the image capturing device, then the other end of the enclosure is approximately near a center of the display device.

In an alternative embodiment, the mirror system 740 includes an optional section 760 that blocks undesired light whether ambient or from the display from being reflected to the image capturing device 710. In this case, only the desired zones or regions of the display device are reflected to the image capturing device 710.

Figure 5:
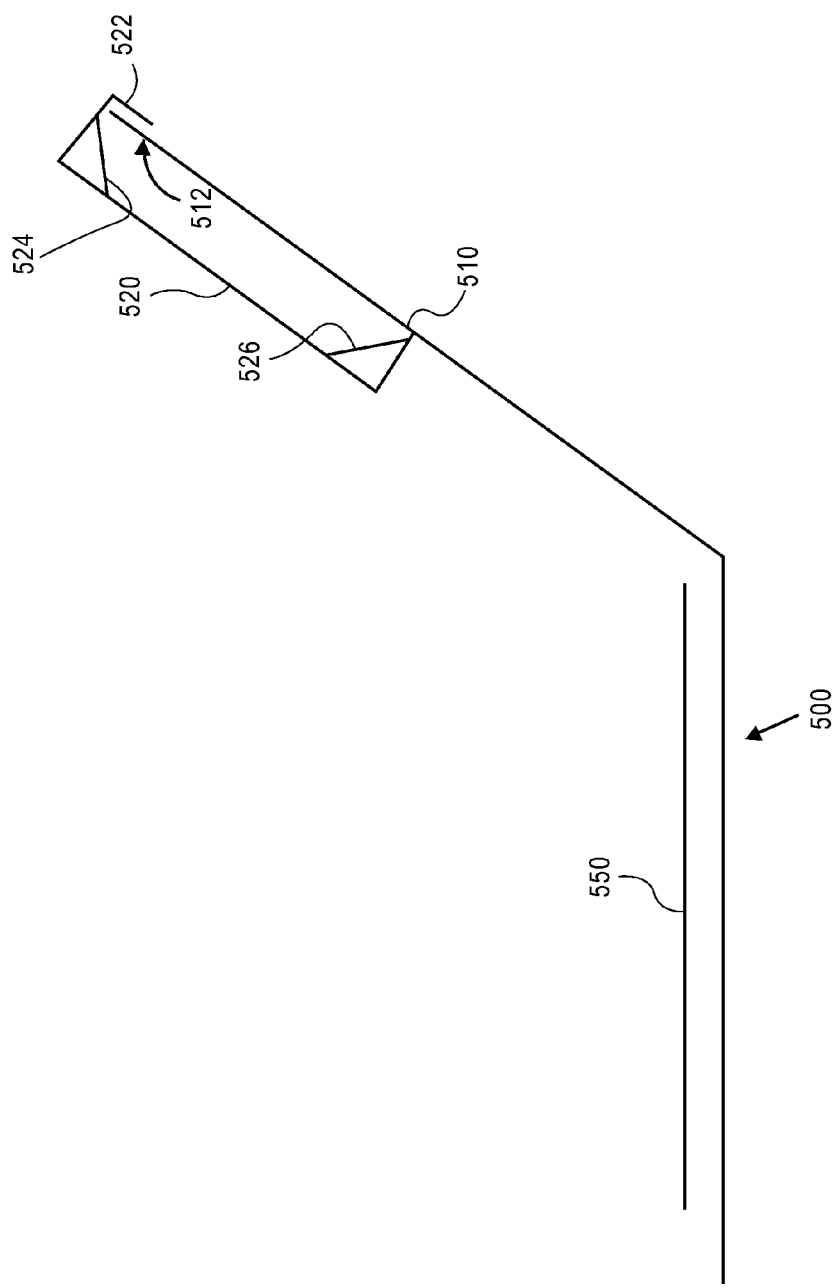
FIG. 5 illustrates a side view of a data processing system having a mirror system coupled to a display device of the data processing system and also coupled to a reference object in one embodiment of the present invention.

FIG. 5 illustrates a side view of a data processing system having a mirror system coupled to a display device of the data processing system and also coupled to a reference object in one embodiment of the present invention. The data processing system 500 includes the display device 510 having a built-in image capturing device 512. A mirror system 520 with at least one mirror (e.g., 524, 526) is operatively coupled to the image capturing device 512. The mirror system 520 may attach to the display device 510 with an attachment 522. One of the mirrors (e.g., 526, 620) is located at one portion of one end of the mirror system (e.g., 520, 600) and is operatively coupled to the display device (e.g., 510, 610) while a remaining portion of the one end of the mirror system includes an opening 636 such that the image capturing device is operatively coupled to a reference object 550 as illustrated in FIGS. 5 and 6.

Figure 6:
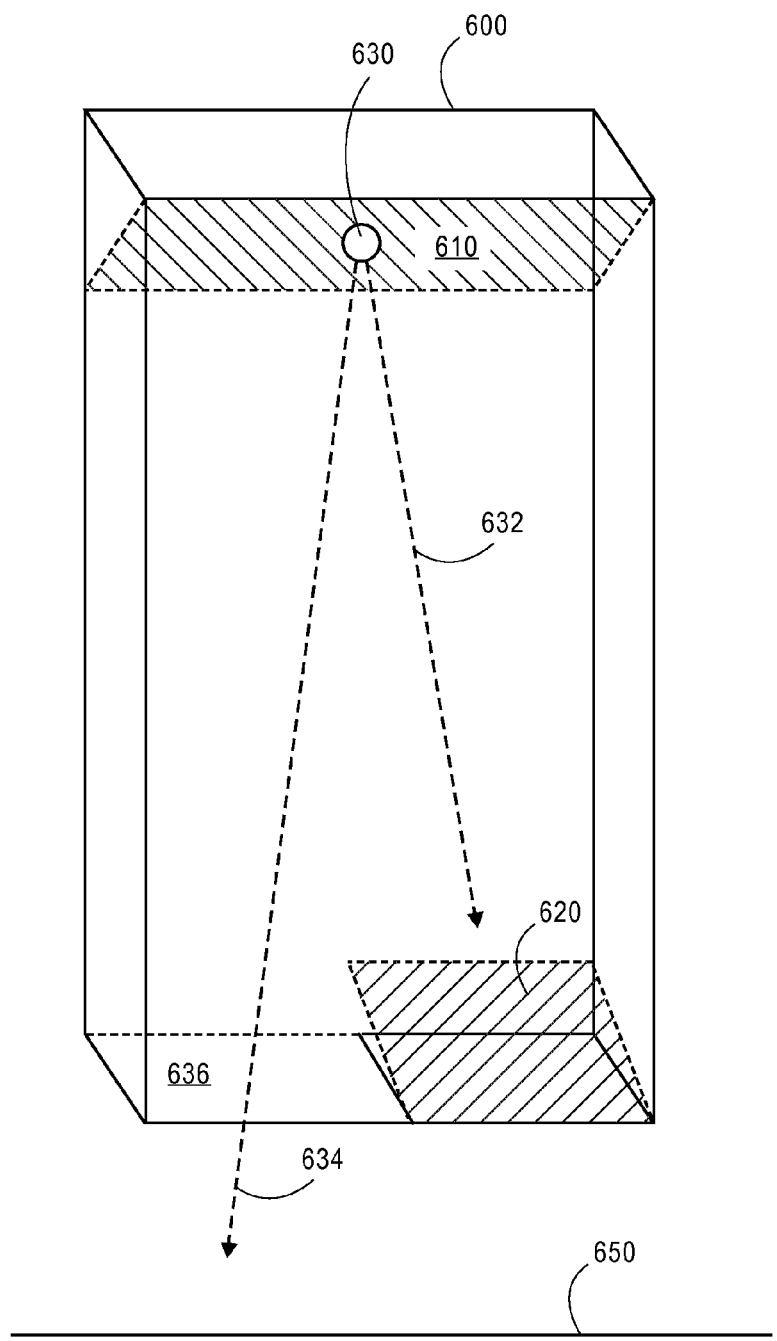
FIG. 6 illustrates a mirror system that can be coupled to a display device of the data processing system and also coupled to a reference object in one embodiment of the present invention.

FIG. 6 illustrates a mirror system that can be coupled to a display device of the data processing system and also coupled to a reference object in one embodiment of the present invention. The mirror system (e.g., 520, 600) with mirrors 610 and 620 reflects one or more reference images in a region (e.g., 220) of the display device along optical path 632 to a region 630 of mirror 610 to the image capturing device. The mirror system also reflects a reference object 550 (e.g., white reference object, white paper, other reference colors, reference color chart) with mirror 610 and opening 636 along optical path 634 to region 630 to the image capturing device. In one embodiment, the mirror 620 has a width that occupies approximately one half (50%) of one end of the mirror system 600 with the remaining one half being the opening 636 for viewing the reference object 550.

One or more processing units (e.g., 902, 1018) are coupled to the display device. The one or more processing units are configured to execute instructions to display the reference images to be captured by the image capturing device through the mirror system having at least one mirror. The one or more processing units are configured to allow a calibration, of colors output from the display device, using the references images displayed on the display device and the reference object. The one or more references images may be matched to the reference object to perform the calibration.

Figure 8A:
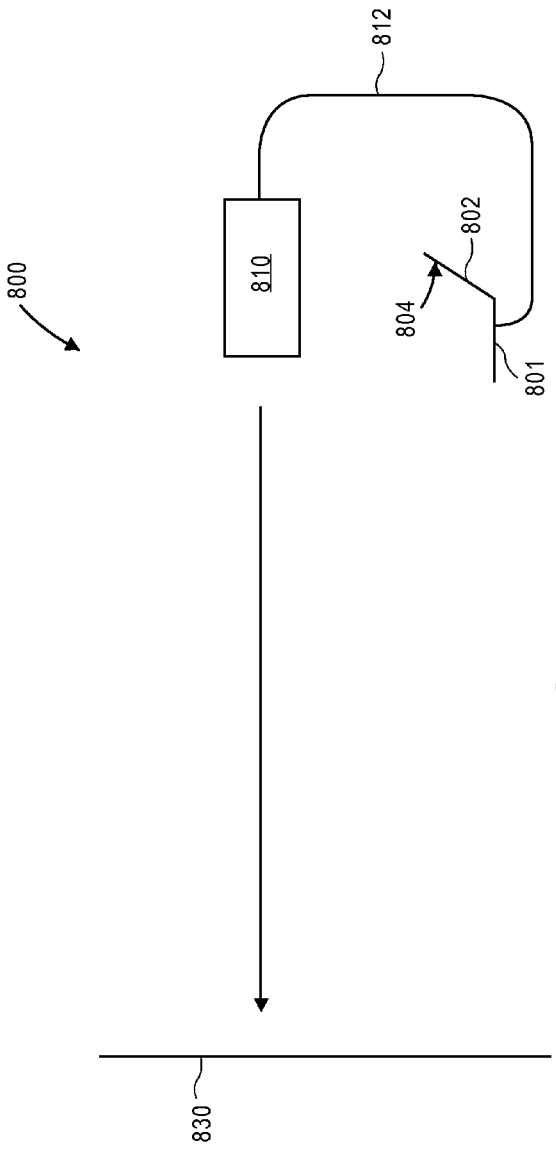
FIG. 8A illustrates a side view of a data processing system that is coupled to a projection system in order to calibrate the projection system in one embodiment of the present invention.

FIG. 8A illustrates a side view of a system that includes a data processing system that is coupled to a projection system in order to calibrate the projection system in one embodiment of the present invention. The system 800 includes a data processing system 801 that is coupled (e.g., wired or wirelessly) to the projection system 810. The data processing system includes one or more processing units and a display device 802 having an integrated camera 804. A projector screen 830 is operatively and optically coupled to both the projection system 810 and the camera 804. The one or more processing units of the data processing system 801 are configured to execute instructions to display at least one reference image via the projection system 810 on the projector screen 830 and configured to allow a calibration, of colors output from the projection system 810, using at least one image captured by the camera 804.

Figure 8B:
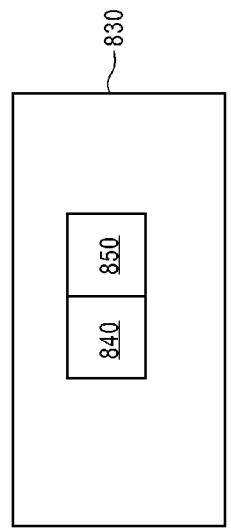
FIG. 8B illustrates a front view of a projector screen 830 in one embodiment of the present invention.

FIG. 8B illustrates a front view of a projector screen 830 in one embodiment of the present invention. The calibration includes comparing a first reference image displayed on a first region 840 of the projector screen 830 to a second reference image of a sequence of reference images displayed on a second region 850 of the projector screen 830. The calibration further includes performing a searching procedure until a color match is obtained between the first reference image and one reference image of the sequence of reference images that includes the second reference image. The results from the searching procedure are used for deriving a color profile for the projection system 810 with projector screen 830. The data processing system 801 drives the projection system 810 to display the references images on the screen 830. The built-in camera 804 then captures the projected references images, which may be displayed in side by side regions 840 and 850 or displayed in different regions of the projector screen 830.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 9 and 10 illustrate examples of a few of these devices, which are capable of capturing still images and video to implement the methods of the present disclosure.

FIG. 9 is a block diagram of one embodiment of the present invention of a data processing system that generally includes one or more processing units, a display device, and built-in image capturing device. This data processing system 900 may include one or more processing units 902 and a memory 904, which are coupled to each other through a bus 906. The data processing system 900 may optionally include a cache 908 which is coupled to the one or more processing units 902. The data processing system may optionally include a storage data processing system 940 which may be, for example, any type of solid-state or magnetic memory data processing system. Storage data processing system 940 may be or include a computer-readable medium 941. Computer-readable medium 941 can be any device or medium (e.g., storage device, storage medium) that can store code and/or data for use by one or more processing units 902. Medium 941 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 941 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 902 run various software components stored in medium 941 to perform various functions for system 900. In some embodiments, the software components include operating system, communication module (or set of instructions), input/output processing module (or set of instructions), graphics module (or set of instructions), one or more applications (or set of instructions), and calibration module 941 [or set of instructions]. The calibration module 941 corresponds to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 941 may store a subset of the modules and data structures identified above. Furthermore, medium 941 may store additional modules and data structures not described above.

One or more applications can include any applications installed on system 900, including without limitation, a calibration application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player, etc.

System 900 may further include a calibration module for performing the method/functions as described herein in connection with FIGS. 1-10. In one embodiment, the calibration module 942 may at least function to automatically determine a viewing region of a display of a device that is being viewed by an integrated camera of the device. The calibration module may vertically divide the viewing region into first and second zones. The calibration module may cause the integrated image capturing device 959 (e.g., camera) to view a first reference image in the first zone and a second reference image of a sequence of reference images in the second zone based on at least one mirror that is operatively coupled to the camera. The calibration module may perform a searching procedure until a color match is obtained between the first reference image and one of the reference images of the sequence. The calibrations of the calibration module can be performed without intervention of a user and without an external camera or colorimeter.

Calibration module 942 may also interact with calibration application to provide the methods and functionality described herein. Calibration module 942 may be embodied as hardware, software, firmware, or any combination thereof. Although module 942 is shown to reside within medium 941, all or portions of module 942 may be embodied within other components within system 900 or may be wholly embodied as a separate component within system 900.

This data processing system may also optionally include a display controller and display device 910 which is coupled to the other components through the bus 906. The display device 910 may include an integrated image capturing device 959. One or more input/output controllers 912 are also coupled to the bus 906 to provide an interface for input/output devices 914 and to provide an interface for one or more sensors 916 which are for sensing user activity. The bus 906 may include one or more buses connected to each other through various bridges, controllers, and/or adapters as is well known in the art. The input/output data processing systems 914 may include a keypad or keyboard or a cursor control data processing system such as a touch input panel. Furthermore, the input/output devices 914 may include a network interface which is either for a wired network or a wireless network (e.g. an RF transceiver). The sensors 916 may be any one of the sensors described herein including, for example, a proximity sensor or an ambient light sensor. In at least certain implementations of the data processing system 900, the one or more processing units 902 may receive data from one or more sensors 916 or from image capturing device 959 or from optional accelerometer 946 and may perform the analysis of that data in the manner described herein. In certain embodiments of the present disclosure, the data processing system 900 can be used to implement at least some of the methods discussed in the present disclosure.

FIG. 10 is a block diagram of one embodiment of the present invention of system 1000 that generally includes one or more computer-readable mediums 1001, processing system 1004, Input/Output (I/O) subsystem 1006, radio frequency (RF) circuitry 1008 and audio circuitry 1010. These components may be coupled by one or more communication buses or signal lines 1003.

It should be apparent that the architecture shown in FIG. 10 is only one example architecture of system 1000, and that system 1000 could have more or fewer components than shown, or a different configuration of components. The various components shown in FIG. 10 can be implemented in hardware, software, firmware or any combination thereof, including one or more signal processing and/or application specific integrated circuits.

RF circuitry 1008 is used to send and receive information over a wireless link or network to one or more other devices and includes well-known circuitry for performing this function. RF circuitry 1008 and audio circuitry 1010 are coupled to processing system 1004 via peripherals interface 1016. Interface 1016 includes various known components for establishing and maintaining communication between peripherals and processing system 1004. Audio circuitry 1010 is coupled to audio speaker 1050 and microphone 1052 and includes known circuitry for processing voice signals received from interface 1016 to enable a user to communicate in real-time with other users. In some embodiments, audio circuitry 1010 includes a headphone jack (not shown).

Peripherals interface 1016 couples the input and output peripherals of the system to one or more processing units 1018 and computer-readable medium 1001. One or more processing units 1018 communicate with one or more computer-readable mediums 1001 via controller 1520. Computer-readable medium 1001 can be any device or medium (e.g., storage device, storage medium) that can store code and/or data for use by one or more processing units 1018. Medium 1001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 1018 run various software components stored in medium 1001 to perform various functions for system 1000. In some embodiments, the software components include operating system 1022, communication module (or set of instructions) 1024, touch processing module (or set of instructions) 1026, graphics module (or set of instructions) 1028, one or more applications (or set of instructions) 1030, and calibration module [or set of instructions] 1038. The calibration module corresponds to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 1001 may store a subset of the modules and data structures identified above. Furthermore, medium 1001 may store additional modules and data structures not described above.

Operating system 1022 includes various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via RF circuitry 1008 and includes various software components for handling data received from RF circuitry 1008 and/or external port 1036.

Graphics module 1028 includes various known software components for rendering, animating and displaying graphical objects on a display surface. In embodiments in which touch I/O device 1012 is a touch sensitive display (e.g., touch screen), graphics module 1028 includes components for rendering, displaying, and animating objects on the touch sensitive display.

One or more applications 1030 can include any applications installed on system 1000, including without limitation, a color management application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player, etc.

Touch processing module 1026 includes various software components for performing various tasks associated with touch I/O device 1012 including but not limited to receiving and processing touch input received from I/O device 1012 via touch I/O device controller 1032.

System 1000 may further include calibration module 1038 and image capturing device 1060 for performing the method/functions as described herein in connection with FIGS. 1-10. The image capturing device 1060 is integrated with the system 1000 and may be coupled to the peripheral interface 1016 as illustrated in FIG. 10 or integrated with one of the I/O devices 1012 or 1014.

Module 1038 may also interact with color management application 1030 to provide the methods and functionality described herein. Module 1038 may be embodied as hardware, software, firmware, or any combination thereof. Although module 1038 is shown to reside within medium 1001, all or portions of module 1038 may be embodied within other components within system 1000 or may be wholly embodied as a separate component within system 1000.

I/O subsystem 1006 is coupled to touch I/O device 1012 and one or more other I/O devices 1014 for controlling or performing various functions. Touch I/O device 1012 communicates with processing system 1004 via touch I/O device controller 1032, which includes various components for processing user touch input (e.g., scanning hardware). One or more other input controllers 1034 receives/sends electrical signals from/to other I/O devices 1014. Other I/O devices 1014 may include physical buttons, dials, slider switches, sticks, keyboards, touch pads, additional display screens, or any combination thereof.

If embodied as a touch screen, touch I/O device 1012 displays visual output to the user in a GUI. The visual output may include text, graphics, video, and any combination thereof. Some or all of the visual output may correspond to user-interface objects. Touch I/O device 1012 forms a touch-sensitive surface that accepts touch input from the user. Touch I/O device 1012 and touch screen controller 1032 (along with any associated modules and/or sets of instructions in medium 1001) detects and tracks touches or near touches (and any movement or release of the touch) on touch I/O device 1012 and converts the detected touch input into interaction with graphical objects, such as one or more user-interface objects. In the case in which device 1012 is embodied as a touch screen, the user can directly interact with graphical objects that are displayed on the touch screen. Alternatively, in the case in which device 1012 is embodied as a touch device other than a touch screen (e.g., a touch pad), the user may indirectly interact with graphical objects that are displayed on a separate display screen embodied as I/O device 1014.

Embodiments in which touch I/O device 1012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1000 also includes power system 1044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1016, one or more processing units 1018, and memory controller 1020 may be implemented on a single chip, such as processing system 1004. In some other embodiments, they may be implemented on separate chips.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A data processing system, comprising:
a display device having a built-in image capturing device;
at least one mirror operatively coupled to the image capturing device to reflect one or more reference images in a first region of the display device and one or more references images in a second region of the display device to the image capturing device; and
one or more processing units coupled to the display device, the one or more processing units are configured to execute instructions to display the reference images to be captured by the image capturing device through the at least one mirror and configured to allow a calibration, of colors output from the display device, using the references images captured by the image capturing device, wherein the calibration comprises:
comparing a first reference image displayed on the first region of the display device to a sequence of reference images displayed on the second region of the display device; and
controlling the output of a remaining region of the display device outside of the first and second regions to control output values of the image capturing device to be within a mid-range of output values.

2. The data processing system of claim 1, wherein the calibration is performed automatically without the intervention of a user and without an external image capturing device.

3. The data processing system of claim 1, further comprising:
a calibrating device that includes the at least one mirror with each mirror being operatively coupled to the image capturing device and the display device.

4. The data processing system of claim 1, wherein one of the mirrors is located at one portion of one end of the calibrating device and is operatively coupled to the display device while a remaining portion of the one end includes an opening such that the image capturing device is operatively coupled to a reference object.

5. A computer-implemented method, comprising:
displaying in a first zone of a viewing region of a display of a device a first reference image and displaying in a second zone of the viewing region a second reference image of a sequence of reference images;
viewing the first reference image and the second reference image in the viewing region with an integrated camera of the device based on at least one mirror that is operatively coupled to the camera;
comparing the first reference image displayed in the first zone to the sequence of reference images in the second zone;
controlling the output of a remaining region of the display outside of the first and second zones to control output values of the camera to be within a mid-range of output values; and
performing a searching procedure, with a calibration module, until a color match is obtained between the first reference image and one of the reference images of the sequence of reference images.

6. The method of claim 5, further comprising:
deriving a display calibration for the device based on the color match between the first reference image and one of the reference images of the sequence of reference images.

7. The method of claim 5, wherein the searching procedure is performed until a color match is obtained between the first reference image and one of the reference images of the sequence of reference images without intervention of a user.

8. The method of claim 5, further comprising:
automatically determining, with the calibration module, the viewing region that is being viewed by the integrated camera of the device; and
vertically driving, with the calibration module, the viewing region into the first and second zones.

9. A non-transitory computer-readable medium containing executable computer program instructions which when executed by a computing system cause said system to perform a method, the method comprising:
automatically determining, with a calibration module, a viewing region of a display of a device that is being viewed by an integrated camera of the device;
vertically dividing, with the calibration module, the viewing region into first and second zones;
viewing a first reference image in the first zone and a second reference image of a sequence of reference images in the second zone with the integrated camera of the device based on at least one mirror that is operatively coupled to the camera;
comparing the first reference image displayed in the first zone to the sequence of reference images in the second zone; and
controlling the output of a remaining region of the display outside of the first and second zones to control output values of the integrated camera to be within a mid-range of output values.

10. The computer-readable medium of claim 9, the method comprising:
performing a searching procedure, with the calibration module, until a color match is obtained between the first reference image and one of the reference image of the sequence.

11. The computer-readable medium of claim 10, wherein the calibrations of the calibration module are performed without intervention of a user and without an external camera.

12. A system for calibrating a projection system, comprising:
a data processing system coupled to the projection system, the data processing system includes one or more processing units and a display device having an integrated camera; and
a projector screen operatively coupled to both the projection system and the camera; wherein the one or more processing units are configured to execute instructions to display at least one reference image via the projection system on the projector screen and configured to allow a calibration, of colors output from the projection system, using at least one image captured by the camera, wherein the calibration comprises:
comparing a first reference image displayed on a first region of the projector screen to a second reference image of a sequence of images displayed on a second region of the projector screen; and
controlling the output associated with a remaining region of the projector screen outside of the first and second the regions to control output values of the camera to be within a mid-range of output values.

13. The system of claim 12, wherein the calibration further comprises performing a searching procedure until a color match is obtained between the first reference image and one reference image of the sequence of reference images that includes the second reference image.

14. An adjustable a mirror system, comprising:
- an enclosure operatively coupled to a device having an integrated camera and a display; and
- at least one mirror being supported by the enclosure, the at least one mirror operatively coupled to the integrated camera to reflect one or more reference images from the display to the camera to allow a calibration, of colors output from the display, using the one or more reference images, wherein the at least one mirror has an adjustable angle to allow a user to adjust the mirror angle for calibration even if the viewing angle between a user and the display is different than 90 degrees, wherein the calibration comprises:
  - comparing a first reference image displayed on a first region of the display to a sequence of reference images displayed on a second region of the display; and
  - controlling the output of a remaining region of the display outside of the first and second regions to control output values of the camera to be within a mid-range of output values.

15. The adjustable mirror system of claim 14, wherein the adjustable angle of the at least one mirror is an angle between the mirror and the display that is different than 45 degrees if the viewing angle is different than 90.

16. The adjustable mirror system of claim 14, wherein the adjustable mirror system includes two mirrors with adjustable angles.

17. The adjustable mirror system of claim 14, wherein the adjustable mirror system includes two mirrors having an adjustable distance between the mirrors in order to avoid a moiré effect seen by the camera.

18. The adjustable mirror system of claim 14, wherein the enclosure blocks light from the camera other than light reflected by the at least one mirror from a region of the display device that has one or more reference images.

* * * * *